United States Patent
Laumen et al.

(10) Patent No.: US 7,274,926 B1
(45) Date of Patent: Sep. 25, 2007

(54) METHOD AND DEVICE FOR TRANSMITTING MESSAGES

(75) Inventors: Josef Laumen, Hildesheim (DE); Joerg Reinecke, Sickte (DE); Frank Schange, Hildesheim (DE); Gunnar Schmidt, Wolfenbuettel (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/089,623

(22) PCT Filed: Aug. 17, 2000

(86) PCT No.: PCT/DE00/02780

§ 371 (c)(1),
(2), (4) Date: Jul. 24, 2002

(87) PCT Pub. No.: WO01/26310

PCT Pub. Date: Apr. 12, 2001

(30) Foreign Application Priority Data

Oct. 1, 1999 (DE) .............................. 199 47 578
Nov. 22, 1999 (DE) .............................. 199 56 023

(51) Int. Cl.
*H04M 3/42* (2006.01)
*H04J 3/24* (2006.01)
*G06F 15/16* (2006.01)

(52) U.S. Cl. .............................. 455/414.1; 455/414.2; 455/414.3; 455/412.1; 455/412.2; 455/426.1; 455/419; 370/349; 709/217; 709/218; 709/219; 345/738; 345/864

(58) Field of Classification Search ............ 455/414.1, 455/414.2, 414.3, 412.1, 412.2, 426.1, 426, 455/419; 370/349; 709/217–219; 345/738, 345/739, 864
See application file for complete search history.

(56) References Cited

U.S. PATENT DOCUMENTS 5,377,354 A 12/1994 Scannell et al.

(Continued)

FOREIGN PATENT DOCUMENTS

EP 0 924 946 6/1999

(Continued)

OTHER PUBLICATIONS

Multimedia Messaging Service, Functional Description, 3GPP TS 23.140, v.0.1.0., 3GPP Technical Subgroup Terminals (Oct. 1999).

(Continued)

*Primary Examiner*—Edan Orgad
*Assistant Examiner*—Richard Chan
(74) *Attorney, Agent, or Firm*—Kenyon & Kenyon LLP (57) ABSTRACT

A method for the transmission of messages between at least one main station and a terminal via a telecommunications network, and a matching device for it. The message exchange is controlled by matching device between the at least one main station and terminal as a function of at least one input from terminal or from the at least one main station. The matching device includes at least one interface to the main station, and one interface to the terminal. Furthermore, a storage device is provided for storing at least one input from terminal or from at least one main station for controlling the message exchange between the at least one main station and the terminal. Furthermore, a control unit is provided which controls the message exchange as a function of the at least one input.

26 Claims, 3 Drawing Sheets

U.S. PATENT DOCUMENTS

| | | | |
|---|---|---|---|
| 5,742,668 A | 4/1998 | Pepe et al. | |
| 5,842,210 A * | 11/1998 | Chen et al. | 707/10 |
| 5,895,471 A * | 4/1999 | King et al. | 707/104.1 |
| 5,903,845 A * | 5/1999 | Buhrmann et al. | 455/461 |
| 5,917,897 A * | 6/1999 | Johnson et al. | 379/114.02 |
| 5,958,018 A * | 9/1999 | Eng et al. | 709/246 |
| 6,023,700 A * | 2/2000 | Owens et al. | 707/10 |
| 6,088,594 A * | 7/2000 | Kingdon et al. | 455/457 |
| 6,138,158 A * | 10/2000 | Boyle et al. | 709/225 |
| 6,243,739 B1 * | 6/2001 | Schwartz et al. | 709/206 |
| 6,370,389 B1 * | 4/2002 | Isomursu et al. | 455/466 |
| 6,466,783 B2 * | 10/2002 | Dahm et al. | 455/414.2 |
| 6,473,609 B1 * | 10/2002 | Schwartz et al. | 455/406 |
| 6,560,640 B2 * | 5/2003 | Smethers et al. | 709/219 |
| 6,947,738 B2 * | 9/2005 | Skog et al. | 455/466 |

FOREIGN PATENT DOCUMENTS

| | | |
|---|---|---|
| GB | 2 328 110 | 2/1999 |

OTHER PUBLICATIONS

Composite Capability/Preference Profiles (CC/PP): A User Side Framework for Content Negotiation, W3C Note, (Jul. 27, 1999).
Recommendation X.400.
Recommendation X.430.
Recommendation T62.
Recommendation T70.
Recommendation T71.
Livre Mouly et Paulet, pp. 560 and 563.

* cited by examiner

METHOD AND DEVICE FOR TRANSMITTING MESSAGES

FIELD OF THE INVENTION

The present invention relates to a method of telecommunication between at least one main station and one terminal, and to a matching device.

BACKGROUND INFORMATION

Methods of telecommunication between one main station and one terminal are conventional.

In the so-called Internet e-mail Service, messages are created by a so-called mail client and are transmitted via the Internet to a mail server of a recipient using the so-called SMTP (simple mail transfer protocol) according to RFC 821 (request for command) of the IETF (Internet Engineering Task Force), or using the ESMTP (enhanced simple mail transfer protocol) according to RFC 1869 of the IETF. The recipient can access the transmitted message from the mail server, also with the aid of a mail client. Appropriate protocols are used for access to the transmitted message, for instance, POP (post office protocol) according to RFC 1729 of IETF, or IMAP (Internet message access protocol) according to RFC 2060 of IETF, or even protocols specific to manufacturers. These protocols regulate the exchange of messages between the recipient and the mail server, such as, for instance, the logging on of a mail client to the mail server, authentication of the mail client, etc. For transmission of messages from mail server to mail client, SMTP or ESMTP are generally used. In order to register new messages on the mail server, the mail client checks the mail server sporadically or regularly. This procedure is called polling. If the mail client detects messages present on the mail server for the user of the mail client, it signals this to the user. The user can then initiate access to the message stored for him on the mail server. The initiation of access is also called pull mode. The message is then transmitted from mail server to mail client and can be reproduced there for the user. The method described here is intended essentially for dedicated connections, where the mail client has a permanent connection to the e-mail server, or a connection with relatively brief interruptions. SMTP was originally provided for text messages, by the use of MIME (multipurpose Internet mail extensions) according to RFC 1521 of IETF, such messages can be expanded by attachments. In this connection, the attachments can have any format desired, and are not limited to text messages. However, for transmission, these messages are recoded so that they can also be transmitted in the form of simple text messages.

The SMS service (short message service) according to the GSM standard (global system for mobile communications), GSM 03.40 ETSI differs fundamentally from the internet e-mail service described. It is limited exclusively to text messages having a maximum length of 160 characters, there being (the possibility of) expansions by concatenation of a plurality of such text messages. The SMS service is further based on transmitting the text message from an SMS transmitter to an SMS server, which then automatically transmits it to a mobile terminal. This method is also denoted as push mode. If the mobile terminal in the mobile radio network is not available, for instance, because it is switched off, the message is stored temporarily in the SMS server. Following that, when the mobile terminal can be reached again, this is signaled to the SMS server, and it automatically begins transmission of the text message to the mobile terminal.

SUMMARY

According to an example embodiment of the present invention, the message exchange by a matching device between at least one main station and the terminal may be controlled in dependence on at least one input from the terminal or from the at least one main station. The use of the matching device may make possible the matching of main stations or servers of various services to one terminal, without having to establish a direct connection between the terminal and each respective main station, and without it being necessary to transmit between terminal and each respective main station service-specific protocols and thus different protocols depending on the main station involved. According to the example embodiment of the present invention, the respective main station is not visible to the terminal; only the matching device is visible. Thus, various services for message exchange between terminal and various main stations may be integrated by the matching device, so that a uniform message exchange between the terminal and the matching device becomes possible for the implementation of various services. In the case where only one single main station is connected to the matching device, and the case where a plurality of main stations are connected to the matching device, the matching device may match the message exchange between each respective main station and the terminal to inputs from the user of the terminal, to the properties and capability of the terminal or to inputs from the respective main station. In this manner, the message exchange may be individually and flexibly optimized in dependence upon user inputs or equipment properties for each connection to be established between a main station and a terminal.

By the use of the matching device, service-specific features for the message exchange between the terminal and the respective main station may be canceled out and replaced by user-specific features, which, for transmission of messages to the terminal, may be defined by an input from the terminal, or rather, the user of the terminal.

A transmitting mode independent of the service used may be input by the user of the terminal, so that by means of the matching device, for example, even in SMS service a pull mode may be realized, and in Internet e-mail service a push mode may be realized.

A plurality of messages, from different main stations for example, may be transmitted jointly by the matching device to the terminal in different modes. In this manner, clarity upon receipt of the messages may be enhanced for the user, and it avoids having to activate the terminal several times for receiving messages from various main stations.

The matching device may segment individual parts of a message which includes a plurality of elements and processes them, depending upon the input from the terminal. In this manner, automatic, user-individual preprocessing of such messages may be implemented which requires no input from the user at the terminal, as long as the input for processing of such messages is not to be changed.

A plurality of different data records may be input by a user of the terminal for various functionalities implementable using the terminal, and may be stored in a storage device assigned to the matching device. In this manner, one may match the message exchange between each main station and the terminal to the properties and the capability of various terminal configurations via the matching device. Due to the storage of the data records in the storage device, the data records may not have to be transmitted each time a connection is established between the terminal and the matching device, but only have to be selected in the storage device, which may save transmitting capacity.

The terminal user may select a data record. The terminal may transmit the characterizing identification character of the selected data record to the matching device. A check is performed in the matching device. A data record including the identifying character received may be stored in the storage device. If the data record associated with the identifying character received is present in the storage device, then this data record may be selected. In this manner, only the appropriate identifying character may have to be transmitted from the terminal to the matching device for the selection of the desired data record, so that the data volume required to be transmitted for the selection of the desired data record may be minimized, and the transmitting capacity may be impaired as little as possible.

The data records may be numbered in the sequence in which they are stored in the storage device, the identifying character of the data records may be formed in each case from this numbering. This may provide a very simple and not very costly possibility to form identifying characters, the identifying characters thus may be formed in each case formed as a number, and therefore may require an especially low quantity of transmitting capacity for their transmission.

BRIEF DESCRIPTION OF THE DRAWINGS

An example embodiment of the present invention is represented in the drawings and explained in detail in the following description.

DETAILED DESCRIPTION

Within the framework of standardization of UMTS (universal mobile telecommunications system) a multimedia messaging system (MMS) has currently been specified according to publication "Multimedia Messaging Service, Functional Description", 3GPP TS 23.140, v.0.1.0., 3GPP Technical Subgroup Terminals 1999-10. MMS is a service which, starting from today's SMS service in GSM (SMS: short message service; GSM: global system for mobile communications) is supposed to make possible sending and receiving of messages using, for example, a terminal 5 formed as a mobile phone.

Today's SMS service is limited to a maximum of 160 characters per message, and only text can be transmitted, that is, there exists a limited character set that can be used.

In contrast to an SMS, an MM (multimedia message) is not to be limited either to a certain length or to text representation. Instead, MM is supposed to support multiple media types.

Figure 2:
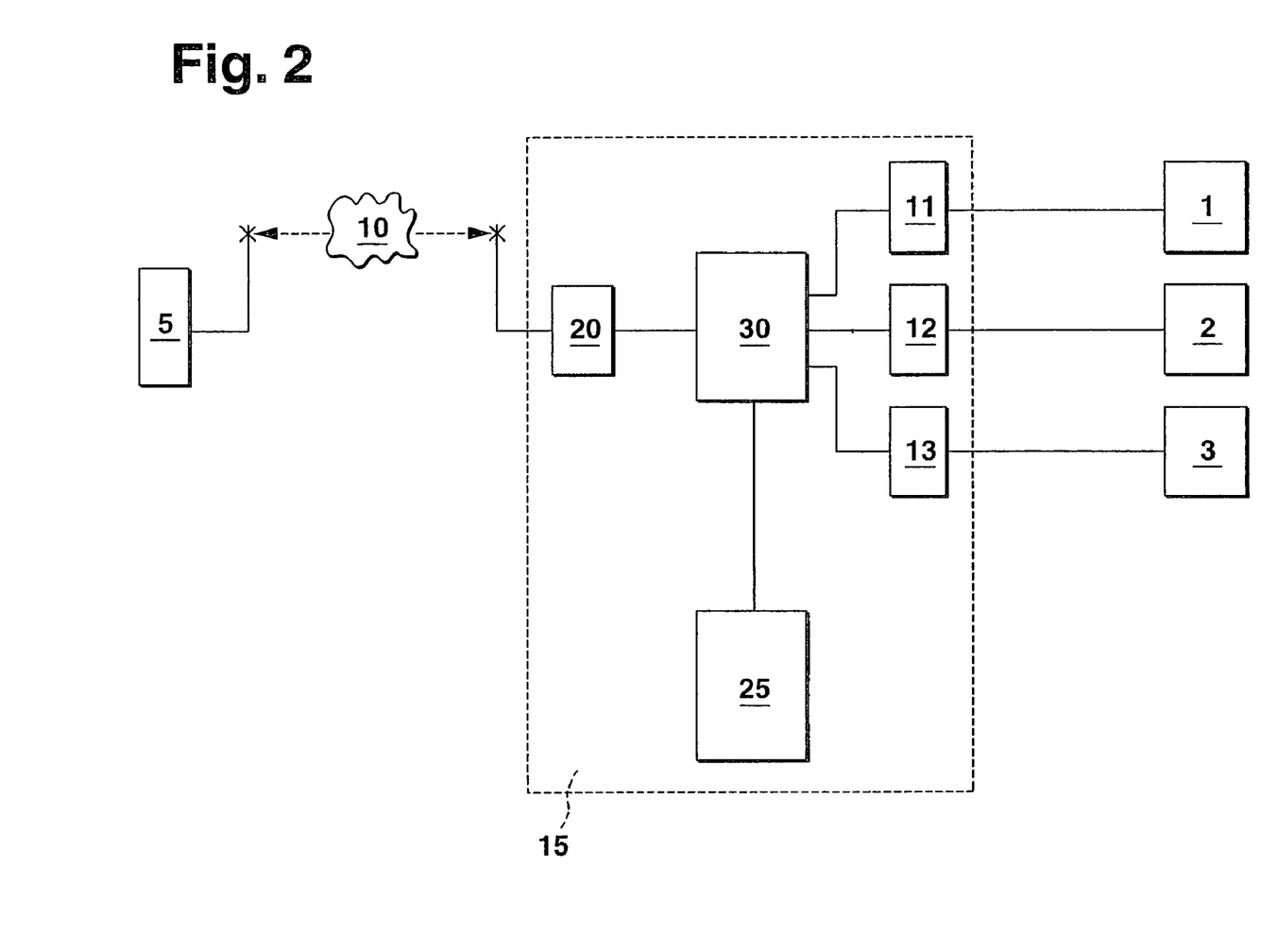
FIG. 2 is a block diagram of a matching device according to the present invention for performing the method according to the present invention.

In the MMS service, a matching device denoted as MMS relay has a central function. This element may be connected, via media of the greatest difference, to different kinds of main stations 1, 2, 3 denoted as servers or service providers, such as an e-mail server, fax server, voice mailbox, MMS server or the like, as illustrated in FIG. 2. The purpose is to make accessible to the user of terminal 5 all such information/messages as are present on the servers named.

Thus, via MMS relay 15, the user of terminal 5 may have access to his e-mails lying in an e-mail server, to faxes "waiting" for him on a fax server, and to voice messages recorded for him on a voice mailbox.

Aside from the receipt of messages, however, it is also intended that the user may be able to write messages and send these to the desired recipient via MMS relay 15.

Figure 1:
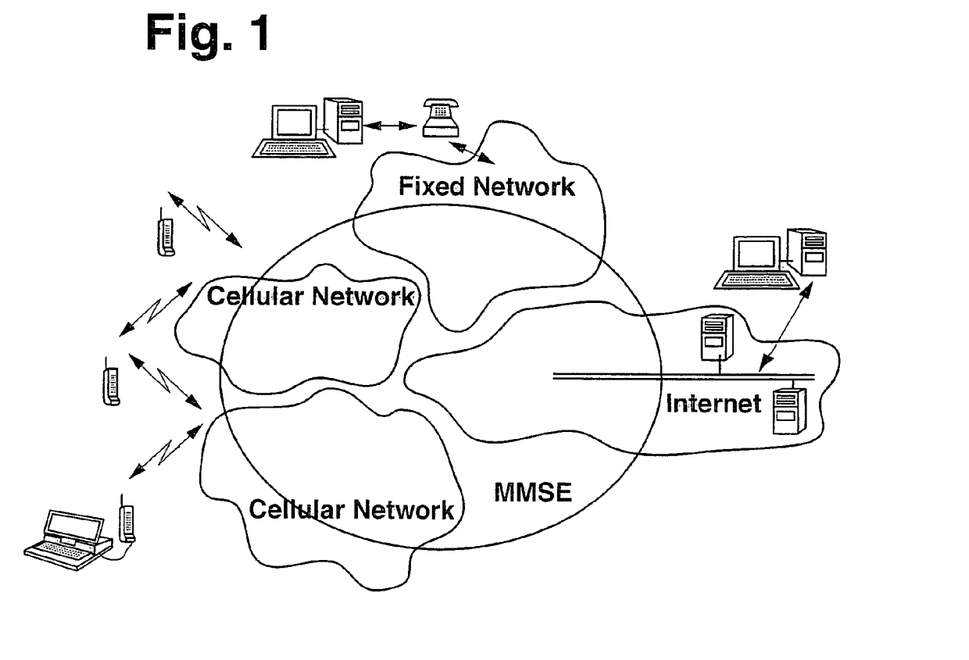
FIG. 1 is a schematic representation of an integration of various information networks for an integrated multimedia message service.

FIG. 1 illustrates schematically an MMSE (multimedia messaging service environment), such as may be provided, for example, for mobile radio systems according to the UMTS standard (universal mobile telecommunications system) or according to the GSM standard (global system for mobile communications). In this connection, MMSE represents a system in which new and existing services such as mobile radio telephony, fixed network telephony, Internet and the like may be integrated, and the separation, existing up to now, of the individual services within the various networks has been lifted. Furthermore, the mobile radio telephony service in FIG. 1 is illustrated as two mobile radio networks, each denoted as a "cellular network". The fixed network telephone service is illustrated in FIG. 1 as fixed network, and characterized by the term "fixed network". Internet service is illustrated and denoted as "Internet" in FIG. 1. According to the example as in FIG. 1, the MMSE incorporates all the networks or services illustrated. In addition, the MMSE includes various service elements which may be flexibly implemented in any of the networks illustrated. Matching device 15 as shown in FIG. 2, may be such a service element.

Referring now to FIG. 2, matching device 15 includes a control unit 30, to which a storage device 25 may be connected. Furthermore, a fourth interface 20 to a terminal 5 may be connected to control unit 30, fourth interface 20, for instance, may be an air interface or a wireless interface, and terminal 5 may be a mobile terminal, for instance, in the form of a mobile phone. The exchange of data between terminal 5 and fourth interface 20 occurs over a telecommunications network 10, which may be configured as a mobile radio network, if fourth interface 20 is a wireless interface and terminal 5 is a mobile terminal. Alternatively, telecommunications network 10 may be a fixed network, and terminal 5 as well as fourth interface 20 may be wire-bound. In the following, however, there is described as an example the case in which fourth interface 20 is wireless and terminal 5 is mobile.

In addition, a first interface 11, a second interface 12 and a third interface 13 may be connected to control unit 30. A first main station 1 may be connected to matching device 15 via first interface 11. A second main station 2 may be connected to matching device 15 via second interface 12. A third main station 3 may be connected to matching device 15 via third interface 13.

In this connection, each of main stations 1, 2, 3 may provide one or more services. The services provided by main stations 1, 2, 3 thus differ from one another in the example embodiment described here. In order to be able to use a service from one of main stations 1, 2, 3, terminal 5 does not have to establish in each case a service-specific connection to the appropriate main station. Rather, terminal 5 establishes a connection to matching device 15, for each service to be used, and it converts the various services of main stations 1, 2, 3 into a uniform style for terminal 5. This uniform style may be input by terminal 5 or rather the user of terminal 5, and may be transmitted by terminal in the form of a data record via telecommunications network 10 to matching device 15, and stored in storage device 25.

In the following, assume the first main station 1 is provided, for example, for an electronic postal service, such as e-mail. Assume the second main terminal 2 is provided, for instance, for an SMS service. Assume, the third main station 3 is provided, for instance, for a fax mail service. Now, for example, assume the input from terminal 5 is stored in storage device 25, such that messages from matching device 15 to terminal 5 are to be transmitted in the form of SMS messages. In another example embodiment, in a corresponding manner in the opposite direction, SMS messages in the form of e-mail could also be transmitted by matching device 15 to terminal 5. Furthermore, the input of terminal 5 stored in storage device 25 may provide that the messages are transmitted in the pull mode described from matching device 15 to terminal 5, that means, then, only at the prompting of terminal 5. A message received in first main station 1 for terminal 5 may be recognized by control device 30, on account of appropriate signaling from first main station 1. Subsequently, matching device 15 signals terminal 5 via telecommunications network 10 that there is a message for terminal 5 in first main station 1. By sending an appropriate prompting signal via telecommunications network 10, terminal 5 may thereafter prompt matching device 15 to transmit the message present in first main station 1. At the detection of this prompting signal, control unit 30 induces first main station 1 to transmit the message present for terminal 5. If, for example, this message is present as e-mail, control unit 30 recognizes this. According to the input from terminal 5 stored in storage device 25, control unit 30 converts the e-mail message to one or more SMS messages, depending on the length of the e-mail message. This SMS message or these SMS messages may, as necessary, also be stored temporarily in storage device 25 via telecommunications network 10, when terminal 5 is temporarily inaccessible. Transmission of the SMS message or of the SMS messages by matching device 15 to terminal 5 then occurs when terminal 5 is accessible, and, as described, on the assumption that the prompting signal was detected by control unit 30.

In a corresponding manner, control device 30 converts a fax message received by third main station 3 via third interface 13 to one or more SMS messages, and sends these, after prompting by terminal 5, via fourth interface 20 and telecommunications network 10 to terminal 5.

An SMS message received at matching device 15 from second main station 2 via second interface 12 may be recognized as such by control unit 30, and thus may not need to be converted, but may, after prompting by terminal 5, be transmitted, in the pull mode described, via fourth interface 20 and telecommunications network 10 to terminal 5.

In corresponding fashion, control device 30 may recognize messages that were received from terminal 5 via telecommunications network 10 and fourth interface 20 at matching device 15, and convert them, according to an input from a main station addressed by these messages, to a format requested by this main station and transmit them to this main station, e.g., text to voice mail or text to fax. In this connection, the inputs made by the respective main stations may also be stored in storage device 25. The inputs of a plurality of main stations may also be stored there.

Figure 3:
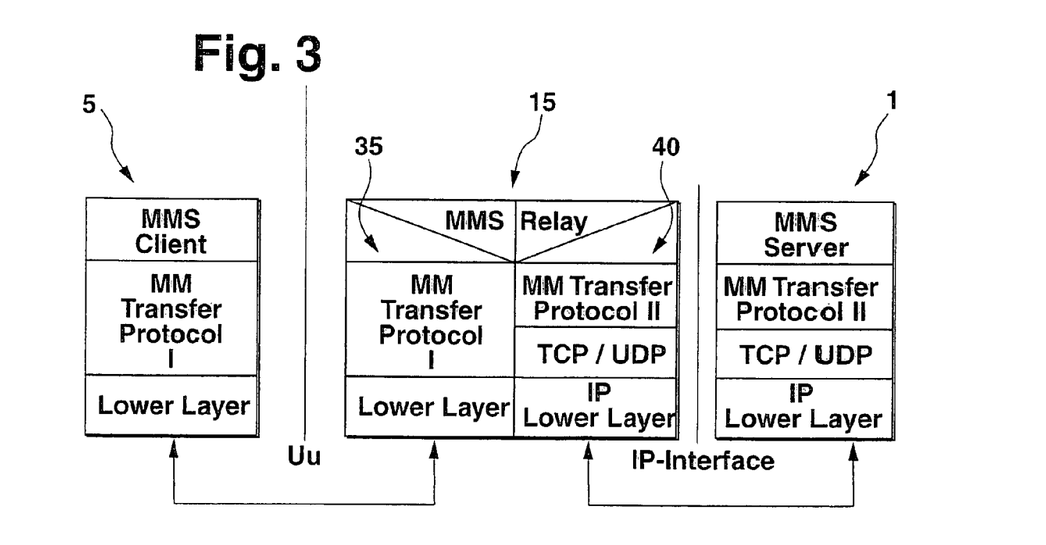
FIG. 3 is a representation of the protocol layers in general form required for the message exchange according to the present invention.

With the aid of FIG. 3, an example embodiment of the present invention is represented at the protocol level and described in greater detail. Here, terminal 5 is also denoted as MMS client (multimedia message service). In FIG. 3 and as described, matching device 15 may also be denoted as MMS relay. In FIG. 3, for example, first main station 1, also denoted as MMS server, is supposed to be connected to matching device 15. Fourth interface 20 as an air interface between terminal 5 and matching device 15 is denoted in FIG. 3 as $U_u$. First interface 11 for connecting first main station 1 to matching device 15 is denoted in FIG. 3 as IP interface (internet protocol). Matching device 15 and first main station 1, which was selected in this example to substitute for all main stations connected to matching device 15, form the described MMSE, in this connection.

The MMS server and MMS relay 15 may not necessarily have to be separated from each other as illustrated in FIG. 3, but may also form one physical unit. Separation of MMS relay 15 and MMS server according to FIG. 3, or a distributed arrangement of the two elements may be sensible if, in the case of the MMS server, and Internet e-mail server is involved. In this case, MMS relay 15 and the MMS server are connected to each other via the usual protocol layers. In this connection, MMS relay 15, on the side of air interface $U_u$, includes a first protocol layer sequence which corresponds to the protocol layer sequence of terminal 5. Furthermore, MMS relay 15 includes a second protocol layer sequence on the side of the IP interface, which corresponds to the protocol layer sequence of first main station 1. In this context, as MM transfer protocol (multimedia messaging) an upper protocol layer is generally denoted, which, for example, may be configured as SMTP or ESMTP or even in a manufacturer-specific manner. Here, the MM transfer protocol on the side of air interface $U_u$ may differ from MM transfer protocol on the side of the IP interface. The MM transfer protocol on the side of air interface $U_u$ is therefore characterized by I in FIG. 3, and the MM transfer protocol on the side of the IP interface is characterized by II, in order to take account of this circumstance. In this connection, for example, MM transfer protocol II may be developed as an SMTP and MM transfer protocol I may be developed for transmission of SMS messages, in order to realize the application described in FIG. 2. On the side of the IP interface, the upper layer may be subdivided into MM transfer protocol II and TCP/UDP (transmission control protocol/user datagram protocol). The lower layer is generally denoted as lower layer, and may be used for developing and establishing a connection between matching device 15 and terminal 5 on the one hand, as well as between matching device 15 and the respective main station on the other hand, and may also be adapted to the type of messages to be transmitted via the appropriate interface. So, for example, the lower layer assigned to the IP interface according to FIG. 3 is developed as an IP (Internet protocol) and the lower layer lying below it.

In this context, MMS relay 15 performs a matching of the message exchange between the MMS server and the MMS client. In this context, for one message which is to be sent from the MMS server to the MMS client, the second protocol layer sequence 40 of MMS relay 15 may be run through from bottom to top. Subsequently a change of form of the message occurs in MMS relay 15, according to the input of terminal 5. Thereafter, the message thus changed in form runs through the first protocol layer sequence 35 of MMS relay 15, assigned to air interface $U_u$, from top to bottom, so that the message may be dispatched to the MMS client. The protocol and message conversion runs correspondingly in the opposite direction for messages to be transmitted from MMS client via MMS relay 15 to MMS server. The protocol layer sequence of second main station 2 and third main station 3 may each be distinguished the protocol layer sequence of first main station 1 as in FIG. 3, second interface 12 and third interface 13 having then assigned to them in each case their own second protocol layer sequence 40, on the side of MMS relay 15, which corresponds to the protocol layer sequence of the connected main station. In this manner, by use of first interface 11, second interface 12, and third interface 13, three different protocol layer sequences may be implemented on the part of MMS relay 15, each corresponding the protocol layer sequence of the connected main station. In the system described as in FIG. 3, it is essential that the MMS client communicate with one or more MMS servers via MMS relay 15, and vice versa. In this connection, the structure illustrated permits, on the one hand, a flexible integration of a plurality of different MMS servers or main stations from different networks, or for different services, as for example a fax service or a voice mail service which are implemented on a cellular mobile radio network, and an e-mail service which is implemented via the Internet. By the use of matching device 15, terminal 5, if it is developed as a mobile radio device, for instance according to the GSM standard, may be offered, additionally to the implementation of mobile radio-specific functions such as SMS service, the use of standardized mail services, such as ones according to the Internet standard of IETF along with the protocols, methods and MMS servers required for this.

The functions to be performed by MMS relay 15 may be subdivided into several groups. A first group of such functions may make possible the integration of different services or different MMS servers by matching device 15. The MMS servers of different services, such as e-mail, voice mail or fax send their messages via MMS relay 15, which converts these messages into the same form, to terminal 5. In this case it may be necessary to convert different data formats, such as fax format to graphics format. However, it may also be necessary, additionally or alternatively, to convert the data type of such a message, for instance, to transcribe a text message into a voice mail message, so that the text message may be reproduced acoustically at terminal 5.

A second group of functions in MMS relay 15 may be necessary for determining whether terminal 5 may be reached by matching device 15 via telecommunications network 10. For this, it may be necessary for MMS relay 15 to have a connection to a further message element, such as an HLR (home location register), in order to receive information as to whether terminal 5 is logged on or available in telecommunications network 10. If the respective terminal 5 cannot be reached, the message to be communicated may be stored in storage device 25. As soon as terminal 5 may be reached again, and MMS relay 15 finds this out via the described network element, MMS relay 15 automatically continues the communicating process previously broken off by storing the message.

A third group of functions relates to the transmission mode to be set for transmitting messages from matching device 15 to terminal 5. Here, it should be possible, on the one hand, to transmit messages directly from matching device 15 to terminal 5 in push mode. On the other hand, it may be possible for terminal 5 only to be informed by matching device 15 that a message for terminal 5 is stored in matching device 15 or in one of associated main stations 1, 2, 3. These messages may then be retrieved at terminal 5 via matching device 15 or may be passed on to another mail system. This transmission mode corresponds to the pull mode described. The user of terminal 5 may preselect by a data record which transmission mode may be used for which message or which data type of message, and he may send this data record to matching device 15 for storage in storage device 25. Such a data record is also described as a profile. When MMS relay 15 recognizes the receipt of a new message for terminal 5 in one of main stations 1, 2, 3, or when this is signaled to MMS relay 15 by one of main stations 1, 2, 3, MMS relay 15 checks, in dependence upon the profile inputs stored in storage device 25, in which transmission mode the message is to be transmitted to terminal 5, such as whether in push or in pull mode. In accordance with the input transmission mode, the transmission of the message to terminal 5 may then be controlled by control device 30.

A further group of functions of matching device 15 relates to segmenting or combining messages. Messages may be composed of several elements, such as e-mail, which may have different attachments. MMS relay 15 may treat each element of a message individually, that is, under certain circumstances it may pass on individual elements of the message to terminal 5, store others in storage device 25, cancel yet others, or send them on to another mail system. This method is denoted as segmentation of messages. Correspondingly, a message may be newly combined, for example, from message elements from different main stations 1, 2, 3. Here, for instance, all new elements input into main stations 1, 2, 3 which are to be transmitted to terminal 5 in push mode, and all new elements input into main stations 1, 2, 3 which are to be transmitted to terminal 5 in pull mode are combined, in each case, and are transmitted in the respective transmission mode to terminal 5. All message elements which are supposed to be sent to the same address, for instance, passed on in a different mail system, may be combined into a single message and passed on to this mail system. Now, whether messages from different main stations should be combined to a common message, if they are to be transmitted to terminal 5 using the same transmission mode, may also be specified in a user-defined profile. The same goes for segmentation of a message of several message elements which was received from a single main station for terminal 5. In this context, it may be specified by the user of terminal 5, with the aid of a profile, which data types or data formats of message elements of such a message are to be treated individually in which of the described forms. For example, all message elements in a video format may be passed on to another terminal in another mail system which may be in a position to reproduce the video data. Message elements having text messages may be provided in this example, for dispatching to terminal 5 according to profiles, and message elements in fax form may be provided according to profiles, in this example, for storage in storage device 25 for later retrieval.

A message for terminal 5, input in a respective manner, for example, in first main station 1, having such attachments or message elements, may then be segmented according to the specifications in the user-defined profile stored in storage device 25, in order to be able to process the individual message elements of this message according to the specifications of the profile as described.

In general, the user-defined profile may be a data record which may be determined by the user of terminal 5 and may be stored in storage device 25 of MMS relay 15. It determines the behavior of MMS relay 15 and specifies which messages or message elements are transmitted directly or after retrieval, i.e., in push or pull mode, to terminal 5, which messages or message elements are automatically passed on to another mail system or cancelled, which messages or message elements are converted to another format, etc. In order to be able to perform the processing provided with the aid of profiles for the messages or message elements, these messages or message elements must be able to be differentiated from one another and identified. Differentiating features for identifying the messages or message elements are, for example, data type, that is, fax, voice mail, e-mail, SMS, etc., and the length of the messages or the message elements. In this connection, data type and length of the messages or the message elements may be ascertained by control unit 30 in a suitable manner, for instance, by evaluating the header information having the necessary specification, which is attached to the messages or the message elements. The profile may also contain specifications specific to a terminal, which may not be influenced by the user, and which specify the resources available to terminal 5, for instance, the graphics capability of an indicator device of terminal 5, the storage capacity of terminal 5 or the like as boundary conditions. However, it may also be provided that the user himself specifies which of the functionalities that may be implemented with terminal 5 are to be taken up into the profile. It is already known from the publication "Composite Capability/Preference Profiles (CC/PP): A User Side Framework for Content Negotiation", W3C Note, Jul. 27, 1999, how a user may determine and change his profile.

Several such profiles may also exist, so as, for example, to give general consideration to capabilities of different indicator devices of terminal 5, or capabilities of different terminal configurations, which may result from the fact that external components such as their own indicator devices may be connected to terminal 5. Such an external component may be, for example, a laptop.

The settings for the current profile, depend on the functionalities of terminal 5, which may be currently available to the user. Even more than today, in the future a mobile user will be able to connect external equipment to his mobile terminal 5 developed, for instance, as a mobile phone or mobile radio, in order to vary, in such a manner, the implementable performance capabilities, using terminal 5, depending on need or what is offered. For reasons of mobility, size of the devices and stand-by time, many mobile radio devices will only offer basic functionalities, even in future. However, the user may broaden these functionalities, for example, by coupling an electronic notebook or an electronic organizer to mobile terminal 5.

If the user of terminal 5 wants to undertake changes in the current profile, the publication "Composite Capability/Preference Profiles (CC/PP): A User Side Framework for Content Negotiation" offers for this a bandwidth-efficient solution. Via telecommunications network 10, developed as a mobile radio network in this example, mobile terminal 5 transmits only the changes with respect to the previous profile to storage device 25, which may also be denoted as profile database, and which may also be arranged outside matching device 15, in connection with it and assigned to it. However, storage device 25 may also be positioned in matching device 15, as illustrated in FIG. 2. Thus, the complete current profile does not have to be transmitted. Nevertheless, when there is a change in the available functionalities of terminal 5, for example due to the connection of another device to terminal 5, at least the profile data changing in comparison to the previous profile may be transmitted to matching device 15.

According to the present invention, the user of terminal 5 may be permitted the use of several, or any number of different profiles. Depending on which external devices the user connects to his mobile terminal 5, that is, depending on which functionalities may be currently available to him, he should then be able to select a suitable profile from a list of his profiles.

For this purpose, the list having the different profiles is stored in profile database 25. In each of these profiles, the user determines which functionalities are available to him and which properties the MMS service is to have with this profile.

The user may give each of these profiles a profile name that is as unique and as declarative as possible. In addition, between mobile terminal 5 and profile database 25, identifying characters, such as in the form of numbers, may be agreed upon for each of these profiles, so that a definite map of an identifying character may be possible for a profile name of each profile and thus for the content of the corresponding profile. A simple manner of agreeing on such identifying characters between mobile terminal 5 and profile database 25 is, for example, to number them in the sequence in which they were stored in profile database 25. All the profiles input by the user of mobile terminal 5 may be transmitted in an initializing phase from terminal 5 via telecommunications network 10 to matching device 15 or rather profile database 25 and stored in profile database 25, for instance, in the sequence of their arrival. Additional profiles defined and input by the user may also be transmitted at a later point in time from terminal 5 to profile database 25, in the manner described, and may there be stored, for instance, in the sequence of their arrival.

Thus, for example, the user of a terminal 5 developed as a GSM mobile radio device may determine a first profile to which he gives the name "pure GSM (SMS only)". In this profile he will then determine that his GSM mobile radio device 5 only supports SMS, and that, therefore, he does not want e-mails present for him on an Internet e-mail server to be sent to him automatically, but in this case rather have them left on the Internet e-mail server. The same applies to other messages, different from SMS messages, present for the user, which he also wants to remain stored in the respective servers.

The user may apply a second profile for the case in which he connects an electronic organizer to his GSM mobile radio device 5. On the organizer he now also has a calendar functionality which may access an organizer server, via mobile radio network 10 and MMS relay 15. In general, any desired number of servers or main stations, respectively, may be connected to matching device 15 in the manner described in FIG. 2. In this case, the user may determine, in the second profile being marked, for instance, "GSM+organizer", to give an example, that not only SMS messages should be sent to him, but also that the user should automatically receive updates of his calendar, such as when his secretary or colleagues change, add or cancel an appointment. Messages of other kinds, which may be different from the message types named, should, according to the second profile, also remain stored on the associated swerver.

He may apply a third profile for the case in which he connects an electronic notepad to his GSM mobile radio device 5. On the electronic notebook he now has several possibilities or applications. Therefore, in the third profile, which he calls, for instance, "GSM+notebook", he sets the following: With mobile terminal 5 thus broadened, not only SMS and calendar functionalities may be implemented, but also, for example, e-mail and fax. Since, generally only urgent and important information may be sent to him by fax, but he gets all kinds of messages by e-mail, he determines, for instance, in profile 3 that messages in SMS, calendar and fax formats are to be automatically sent to him, but e-mails are to remain on the Internet e-mail server. Messages of other types, which differ from the types of messages named, should also remain stored on the assigned server.

In a fourth profile, the user of mobile terminal 5 will consider the case, for instance, that he is not traveling in his home network but is staying outside the country, for example. In such a case, the applicable roaming fees may be too high, so that he may indeed wish to continue to receive SMS messages, but only wants to be informed by SMS concerning incoming calendar messages or faxes, without those being automatically delivered. E-mails and messages of other message types, which differ from the types of messages named, should also remain stored on their associated server.

When beginning to use SMS service, according to the present invention, the user needs further only to select that profile, on his list having profile names, which may be stored in mobile terminal 5, and which corresponds to his wishes and the current functionalities of mobile terminal 5, or the additional current external devices or components that are currently connected. In mobile terminal 5 this selection, this profile name is then mapped on the respective identifying character. This identifying character is then the only thing that has to be transmitted from mobile terminal 5 to MMS relay 15 via the air interface, or rather mobile radio network 10, in order to start MMS service as desired. Because, via this identifying character, MMS relay 15 may obtain the setting for the profile associated with the identifying character in profile database 25.

A user may have to set the capabilities of his terminal 5, or the possible combination of devices in the form of external additional devices or components connected to terminal 5, and his desired configuration of the MSS servive, only one single time or may allow MSS relay 15 to set them at profile database 25. If there is a change in the device combination and/or in his wishes, he only has to select the matching profile from the list.

In each case from the identifying character of the profiles, according to one embodiment of the present invention, it is not the information on the difference from the previous profile that has to be transmitted via the air interface, but only the identifying character of the desired profile. This may save data, and thus, resources on the mobile radio channel in mobile radio network 10, and may speed up the setting of the MMS service.

In MMS relay 15, data type conversions and/or data format conversions are also performed as described. In dependence upon the inputs of the user-defined profile or upon terminal-specific standard inputs, messages or message elements which are present in one of main stations 1, 2, 3 for terminal 5 in a first data type, such as a fax or as text, are changed to another data type, such as fax to graphic, or text to voice. Correspondingly, a message present in a first data format may be converted by MMS relay 15 into a second data format. For example, a GIF graphic (graphic interchange format) may be converted into a JPEG graphic (joint picture expert group), or the text of a first alphabet may be converted into the text of a second alphabet.

It may be provided that MMS relay 15 notifies terminal 5 if new messages or message elements are not automatically passed on to terminal 5, for example, according to the pull mode. To this effect, notification of terminal 5 may be done by MMS relay 15 if messages or message elements, depending on the input of the profile or profiles, are automatically passed on to another mail system or are cancelled.

MM transfer protocol I between MMS relay 15 and MMS client may include, besides the functions for the transmission of a message from matching device 15 to terminal 5, three functional elements: 1) the possibility of establishing a connection from MMS relay 15 to terminal 5, in order to implement the push mode; 2) the possibility of establishing signaling from MMS relay 15 to terminal 5, in order to notify terminal 5 of a message present in one of main stations 1, 2, 3, in order to implement the pull mode; and 3) the possibility of establishing a connection from terminal 5 to MMS relay 15, in order to retrieve a message for terminal 5 stored in one of main stations 1, 2, 3, and thereby to complete the pull mode or to send messages.

The present invention is described below, in light of three different example embodiments. Starting from FIG. 3, in FIG. 4 layer sequences are illustrated for an example in which the MMS server is configured as an Internet e-mail server, and represents first main station 1. MM transfer protocol II is here developed as SMTP or ESMTP. The SMTP or the ESMTP is superordinated to MM transfer protocol I in assignment to air interface $U_u$. The remaining layers correspond to the layers illustrated in FIG. 3. Terminal 5 is an SMTP-capable or an ESMTP-capable terminal. In the case of the Internet e-mail server illustrated in FIG. 4, an Internet e-mail POP (post office protocol) server is involved. The MMS client according to FIG. 4 may be developed in this example as an SMTP client, i.e., an SMTP-capable terminal 5. The connection from MMS relay 15 to the Internet e-mail POP server may be identical to a classical Internet e-mail configuration, in which a POP server stores all e-mails coming in for POP client, and which checks POP client in regular cycles to see whether new mail has come in for it on the POP server. If so, they are loaded in their entirety into POP client, in classical Internet e-mail configuration no MMS relay 15 is provided. The SMTP may be provided as transmission protocol which, as described, uses the TCP/IP (transmission control protocol/Internet protocol), at least for the IP interface.

Figure 4:
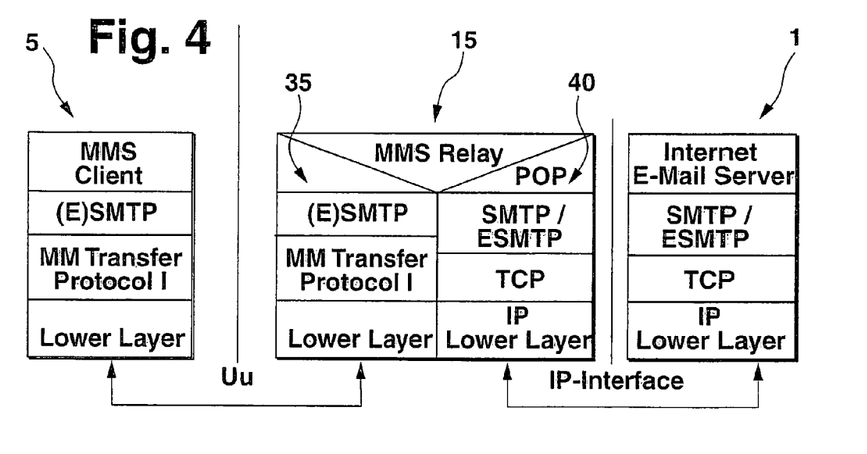
FIG. 4 illustrates the protocol layers for the message exchange according to the present invention in a first example embodiment.

In the first example embodiment according to FIG. 4, MMS relay 15 includes, for the IP interface, the described POP client functionality according to the classical Internet e-mail configuration. A new e-mail on the Internet e-mail POP server may be thus transmitted to MMS relay 15 in the manner described for the classical POP client. MMS relay 15 then determines, in dependence upon the profile entries stored in storage device 25, whether this e-mail, or which elements of this e-mail may be forwarded directly to terminal 5 using push mode, and signals to terminal 5, perhaps additionally, that there are present further elements of this message for transmission to terminal 5 in pull mode, or that these are passed on to another mail system or are cancelled. If no element of the e-mail is transmitted to terminal 5 in push mode, only one notification occurs in one of the forms described. For example, the e-mail should now contain elements for both transmission modes, that is, for push mode and pull mode. MMS relay 15 combines the elements, provided for the push mode according to the profile, into a new message, establishes a transmission channel to terminal 5 and sends these combined elements using SMTP. The other elements are also combined and sent via SMTP to the Internet e-mail server, so as to be passed on from there to another mail system, to be cancelled, or to be stored for the pull mode until retrieved by terminal 5. The notification on the presence of message elements provided for the pull mode may occur together with the transmission of the combined message elements in push mode or separately. If only one notification occurs, i.e., if no message elements are present which must be transmitted to terminal 5 in push mode, this notification may occur using a message generated by MMS relay 15, which may be transmitted to terminal 5 in push mode or uses special signaling channels, such as the SMS service according to the GSM standard.

If terminal 5 cannot be reached via communications network 10, those message elements may also be stored, for example, in storage device 25 of MMS relay 15, which are to be transmitted to terminal 5 in push mode. Correspondingly, notifications may be stored intermediately in storage device 25 of MMS relay 15, which have to be transmitted by MMS relay 15 to terminal 5 with respect to message elements that are not to be transmitted in push mode. The storage of the message elements which are to be transmitted in push mode and/or of the notifications continues until MMS relay 15 is notified, for example, by the HLR that terminal 5 may now be reached via telecommunications network 10. Thereafter, transmission of message elements in push mode or of notifications to terminal 5 may be continued. The storage of message elements and/or notifications may occur in this example in the Internet e-mail server or in MMS relay 15.

Besides the transmission modes, the profile regulates, for instance, conversions of data formats of messages, as is described above. If terminal 5 supports only the JPEG data format in the case of graphics, this may be entered in the profile according to the standard, and MMS relay 15 may automatically convert all graphics message elements received for terminal 5 to JPEG format.

According to the first embodiment, POP is used as an example. Alternatively, the IMAP (Internet message access protocol) or other protocols available for this purpose could also be used.

Figure 5:
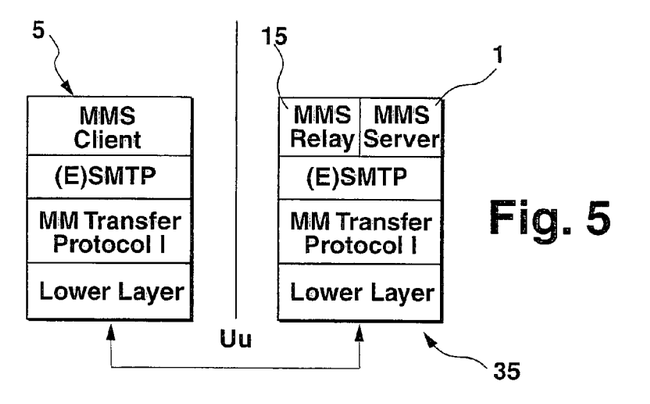
FIG. 5 illustrates the protocol layers for the message exchange according to the present invention in a second example embodiment.

Starting from the first example embodiment as in FIG. 4, FIG. 5 illustrates a second example embodiment in which the MMS server and MMS relay 15 are functionally combined, which may be advantageous for network-internal services, such as voice mail/fax. In this connection, FIG. 5 illustrates the protocol layer sequence of the MMS client, known from FIG. 4, as in FIG. 4, and the first protocol layer sequence 35 for air interface $U_u$ of MMS relay 15 as in FIG. 4. This protocol layer sequence is now shared by MMS relay 15 and the MMS server in a common physical unit as in FIG. 5.

Figure 6:
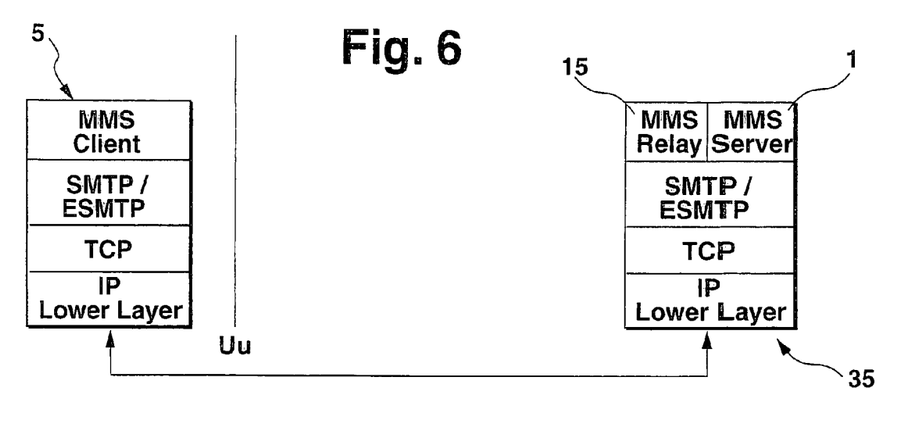
FIG. 6 illustrates the protocol layers for the message exchange according to the present invention in a third example embodiment.

In FIG. 6, the MMS server and MMS relay 15 are combined functionally into a physical unit for IP-based implementation. In this context, the MMS server as in FIG. 6 corresponds in its protocol layer sequence to the Internet e-mail server as in FIG. 4. This protocol layer sequence may be shared by the MMS server and MMS relay 15. The same protocol layer sequence may then be selected for the MMS client as in FIG. 6, air interface $U_u$ representing at the same time an IP interface between the MMS client and MMS relay 15 or the MMS server.

In this connection, FIG. 6 illustrates a third example embodiment. All three example embodiments, as in FIG. 4, FIG. 5 and FIG. 6 may be used in common in MMSE.

Common to all implementations is the uniform service functionality from the point of view of the MMS client, which may be ensured by MMS relay 15, MMS relay 15 being developed either as a separate protocol element or as being functionally integrated with the MMS server.

Several terminals may be connected to fourth interface 20 in the manner described, so that MMS relay 15 may be used in the manner described for several terminals at the same time, at least one profile of each of the connected terminals may be stored in storage device 25 in the manner described.

What is claimed is:

1. A method for transmitting messages between at least one main station and a terminal via a telecommunications network, comprising:
    providing a matching device between the at least one main station and the terminal;
    controlling a message exchange using the matching device, the message exchange being controlled in dependence upon at least one input from one of: i) the terminal, and ii) the at least one main station, wherein the entire message is transmitted in a transmission format that is determined in dependence upon a transmission format request made by one of the terminal and the at least one main station; and
    matching, by the matching device, at least one characteristic for transmission of a message to the at least one input, wherein the at least one characteristic is at least one of a data type, a data format and a transmission mode.

2. The method according to claim 1, further comprising:
    converting, by the matching device, messages from the at least one main station into a standardized form readable by the terminal; and
    transmitting the converted messages to the terminal.

3. The method according to claim 1, further comprising:
    notifying the matching device of an incoming message for the terminal, by the at least one main station;
    if the terminal can be reached, initiating a transmission process for the message to the terminal, according to one of a push transmission mode and a pull transmission mode; and
    if the terminal can not be reached, storing the message until the matching device recognizes that the terminal can be reached.

4. The method according to claim 1, further comprising:
    transmitting directly to the terminal, as a function of the input from the terminal, a message for the terminal present in the at least one main station by the matching device when the terminal can be reached; and
    notifying the terminal of the availability of the message by the matching device, when the terminal can not be reached.

5. The method according to claim 1, further comprising:
    transmitting a plurality of messages, from different ones of the at least one main station, in a combined form to the terminal by the matching device.

6. The method according to claim 1, further comprising:
    segmenting, by the matching device as a function of input from the terminal, individual parts of a message which includes a plurality of elements; and
    processing the message by the matching device.

7. The method according to claim 1, further comprising:
    inputting by a user of the terminal the at least one input from the terminal in the form of a data record; and
    transmitting the data record to the matching device.

8. The method according to claim 1, further comprising:
    inputting by a user of the terminal a plurality of different data records for various functionalities that are implementable using the terminal; and
    storing the plurality of different data records in a storage device assigned to the matching device.

9. The method according to claim 8, wherein each of the plurality of different data records has an assigned identifying character.

10. The method according to claim 9, further comprising:
selecting, by the user, one of the plurality of different data records;
transmitting the assigned identifying character of the selected data record from the terminal to the matching device;
checking, in the matching device, whether a data record having the assigned identifying character is stored in the storage device; and
if the data record having the assigned identifying character is stored in the storage device, selecting, by the matching device, the data record.

11. The method according to claim 9, further comprising:
numbering the plurality of different data records in a sequence in which they are stored in the storage device, identifying characters of each of the plurality of data records being formed from the numbering.

12. The method according to claim 1, further comprising:
using protocols in the terminal and the matching device which include functional elements for a predefined transmission mode for the transmission of a message; and
effecting a suitable signaling of the message for the terminal.

13. A matching device for transmitting messages between at least one main station and terminal via a telecommunications network, comprising:
at least one interface to the at least one main station;
an interface to the terminal;
a storage device configured to store at least one input from one of the terminal and the at least one main station for controlling a message exchange between the at least one main station and the terminal;
a control unit configured to control the message exchange as a function of the at least one input, wherein the at least one input includes a transmission format request made by one of the terminal and the at least one main station; and
a matching device configured to match at least one characteristic for transmission of a message to the at least one input, wherein the at least one characteristic is at least one of a data type, a data format and a transmission mode.

14. A method for transmitting messages between at least two main stations and a terminal via a telecommunications network, comprising:
providing a matching device between the at least two main stations and the terminal; and
controlling a message exchange using the matching device, the message exchange being controlled in dependence upon at least one request from one of the at least two main stations.

15. A matching device for transmitting messages between at least two main stations and a terminal via a telecommunications network, comprising:
at least one interface to at least one of the at least two main stations;
an interface to the terminal;
a storage device configured to store at least one request from at least one of the at least two main stations for controlling a message exchange between the at least two main stations and the terminal; and
a control unit configured to control the message exchange as a function of the at least one request.

16. The method according to claim 1, wherein the data format includes a text format.

17. The method according to claim 1, wherein the data format includes a voice format.

18. The method according to claim 1, wherein the data type includes a fax data.

19. The method according to claim 1, wherein the data format includes a graphics format.

20. The method according to claim 1, wherein the data format includes an e-mail format.

21. A method for transmitting messages between different main stations and at least one terminal via a telecommunications network, the different main stations offering different services, the method comprising:
controlling an exchange of messages by a matching device between the different main stations and the terminal as a function of at least one request of the terminal; and
matching by the matching device in the direction of transmission from the different main stations to the terminal the different services to a uniform service according to the at least one request of the terminal.

22. A method for transmitting messages between different main stations and at least one terminal via a telecommunications network, the different main stations offering different services, the method comprising:
controlling an exchange of messages by a matching device between the different main stations and the terminal as a function of at least one request of the terminal; and
matching by the matching device in the direction of transmission from the different main stations to the terminal the different services to a uniform transmission mode according to the at least one request of the terminal.

23. A method for transmitting messages between at least one main station and at least one terminal via a telecommunications network, the method comprising:
controlling an exchange of messages by a matching device between the at least one main station and the terminal as a function of at least one request of the at least one main station; and
matching by the matching device at least one property for the transmission of the message to the at least one request of the at least one main station, wherein the at least one property for the transmission of the message includes at least one of a data type, a data format, and a transmission mode.

24. A telecommunications network, comprising:
a plurality of different main stations to offer different services;
a terminal; and
a matching device arranged between the different main stations and the terminal to control an exchange of messages between the main stations and the terminal as a function of at least one request of the terminal, the matching device in a direction of transmission from the different main stations to the terminal matches the different services to a uniform service according to the at least one request of the terminal.

25. A telecommunications network, comprising:
a plurality of different main stations to offer different services;
a terminal; and
a matching device arranged between the different main stations and the terminal to control an exchange of messages between the different main stations and the terminal as a function of at least one request of the terminal, the matching device in the direction of transmission from the different main stations to the terminal matches the different services to a uniform transmission mode according to the at least one request of the terminal.

26. A telecommunications network, comprising:
   at least one main station;
   a terminal; and
   a matching device arranged between the at least one main station and the terminal to control an exchange of messages between the at least one main station and the terminal as a function of at least one request of the at least one main station, the matching device matches at least one property for a transmission of the message to the at least one request of the at least one main station, wherein the at least one property for the transmission of the message includes at least one of a data type, a data format, and a transmission mode.

* * * * *

US007274926C1

(12) INTER PARTES REEXAMINATION CERTIFICATE (992nd)
United States Patent
Laumen et al.

(10) Number: US 7,274,926 C1
(45) Certificate Issued: Nov. 7, 2014

(54) METHOD AND DEVICE FOR TRANSMITTING MESSAGES

(75) Inventors: Josef Laumen, Hildesheim (DE); Joerg Reinecke, Sickte (DE); Frank Schange, Hildesheim (DE); Gunnar Schmidt, Wolfenbuettel (DE)

(73) Assignee: IPCom GmbH & Co. KG, Pullach (DE)

Reexamination Request:
No. 95/001,210, Aug. 13, 2009

Reexamination Certificate for:
Patent No.: 7,274,926
Issued: Sep. 25, 2007
Appl. No.: 10/089,623
Filed: Jul. 24, 2002

(21) Appl. No.: 95/001,210

(22) PCT Filed: Aug. 17, 2000

(86) PCT No.: PCT/DE00/02780
§ 371 (c)(1),
(2), (4) Date: Jul. 24, 2002

(87) PCT Pub. No.: WO01/26310
PCT Pub. Date: Apr. 12, 2001

(30) Foreign Application Priority Data

Oct. 1, 1999 (DE) .................................. 199 47 578
Nov. 22, 1999 (DE) .................................. 199 56 023

(51) Int. Cl.
*H04M 3/42* (2006.01)
*H04J 3/24* (2006.01)
*G06F 15/16* (2006.01)

(52) U.S. Cl.
USPC ................. 455/414.1; 455/412.1; 455/412.2; 455/414.2; 455/414.3; 455/419; 370/349; 709/217; 709/218; 709/219; 715/738; 715/864

(58) Field of Classification Search
None
See application file for complete search history.

(56) References Cited

To view the complete listing of prior art documents cited during the proceeding for Reexamination Control Number 95/001,210, please refer to the USPTO's public Patent Application Information Retrieval (PAIR) system under the Display References tab.

*Primary Examiner* — Roland Foster (57) ABSTRACT

A method for the transmission of messages between at least one main station and a terminal via a telecommunications network, and a matching device for it. The message exchange is controlled by matching device between the at least one main station and terminal as a function of at least one input from terminal or from the at least one main station. The matching device includes at least one interface to the main station, and one interface to the terminal. Furthermore, a storage device is provided for storing at least one input from terminal or from at least one main station for controlling the message exchange between the at least one main station and the terminal. Furthermore, a control unit is provided which controls the message exchange as a function of the at least one input.

US 7,274,926 C1

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2-4, 7-11, 14-20 and 22-26 are cancelled.

Claims 1, 5, 6, 12, 13 and 21 are determined to be patentable as amended.

New claims 27-34 are added and determined to be patentable.

1. A method for transmitting messages between at least one main station and a *mobile* terminal via a telecommunications network, comprising:
    providing a matching device between the at least one main station and the *mobile* terminal, *the mobile terminal connected to the matching device via the telecommunications network, wherein the telecommunications network comprises a mobile radio network*;
    controlling a message exchange *between the at least one main station and the mobile terminal* using the matching device, the message exchange being controlled in dependence upon at least one input from [one of: i)] the *mobile* terminal[, and ii) the at least one main station], wherein the [entire message is transmitted in a transmission format that is determined in dependence upon a] *at least one input specifies a preselected* transmission format [request made] *and a preselected data type requested* by [one of] the terminal [and the at least one main station], *the preselected transmission format corresponding to a form of a message according to a message transfer protocol, and wherein the at least one input further specifies whether messages of certain types are to be transmitted to the mobile terminal, stored in a storage device, or forwarded to another system*; [and]
    matching, by the matching device, [at least one characteristic for transmission of a message to the at least one input, wherein the at least one characteristic is at least one of] (*i*) *a transmission format of the message to the preselected transmission format, wherein the entirety of the message is transmitted in the preselected transmission format, and* (*ii*) a data type [, a data format and a transmission mode] *of the message to the preselected data type; and*
    *determining, by the matching device, based on the at least one input, whether the message is to be transmitted to the mobile terminal, stored in a storage device, or forwarded to another system.*

5. The method according to claim 1, [further comprising:] *wherein the at least one main station comprises a plurality of main stations, each of the main stations transmitting messages to the mobile terminal using a different transmission format; and*
    *wherein the method further comprises,* transmitting a plurality of messages, from different ones of the [at least one] main [station] *stations*, in a combined form to the *mobile* terminal by the matching device.

6. The method according to claim 1, further comprising:
    segmenting, by the matching device as a function of *the at least one* input from the *mobile* terminal, individual parts of [a] *the* message which includes a plurality of elements; and
    processing the *individual parts of the* message by the matching device.

12. The method according to claim 1, further comprising:
    using protocols in the *mobile* terminal and the matching device which include functional elements for a predefined transmission mode for the transmission of [a] *the* message; and
    effecting a suitable signaling of the message for the *mobile* terminal.

13. A matching device for transmitting messages between at least one main station and *a mobile* terminal via a telecommunications network, comprising:
    at least one interface [to] *for connecting* the at least one main station *to the matching device*;
    [an] *a wireless* interface [to] *for connecting* the *mobile* terminal *to the matching device via the telecommunications network, the telecommunications network comprising a mobile radio network*;
    a storage device configured to store at least one input from [one of] the *mobile* terminal [and the at least one main station] for controlling a message exchange between the at least one main station and the *mobile* terminal;
    a control unit configured to control the message exchange as a function of the at least one input, wherein the at least one input [includes] *specifies a preselected* transmission format [request made by one of the terminal and the at least one main station] *and a preselected data type requested by the terminal, the preselected transmission format corresponding to a form of a message according to a message transfer protocol, and wherein the at least one input further specifies whether messages of certain types are to be transmitted to the mobile terminal, stored in a storage device, or forwarded to another system*; [and]
    [a] *wherein the* matching device *is* configured to match [at least one characteristic for transmission of a message to the at least one input, wherein the at least one characteristic is at least one of] (*i*) *a transmission format of the message to the preselected transmission format, and* (*ii*) a data type [, a data format and a transmission mode] *of the message to the preselected data type; and*
    *wherein the matching device is further configured to determine, based on the at least one input, whether the message is to be transmitted to the mobile terminal, stored in the storage device, or forwarded to another system.*

21. A method for transmitting messages between different main stations and at least one *mobile* terminal via a telecommunications network, *the different main stations offering different messaging services,* the method comprising:
    controlling *by a matching device* an exchange of messages [by a matching device] between the different main stations and the *mobile* terminal as a function of at least one [request of] *input from* the *mobile* terminal, *wherein the mobile terminal is connected to the matching device via the telecommunications network and wherein the telecommunications network comprises a mobile radio network*; [and]
    *wherein the at least one input specifies a preselected transmission format and a preselected data type requested by the mobile terminal, the preselected transmission format*

*corresponding to a form of the messages according to a message transfer protocol; and* matching by the matching device in the direction of transmission from the different main stations to the *mobile* terminal the different *messaging* services to a uniform service according to the at least one [request of the terminal] input, *wherein said matching comprises matching (i) a transmission format of the messages to the preselected transmission format, and (ii) a data type of the messages to the preselected data type.*

27. *The method of claim 1, wherein the at least one input further specifies that messages of the preselected data type are to be transmitted to the mobile terminal according to a preselected transmission mode.*

28. *The method of claim 1, wherein the at least one input further specifies that only certain message elements are to be transmitted to the mobile terminal according to a preselected transmission mode.*

29. *The method of claim 1, wherein the at least one input further specifies whether data in the message is to be converted to another data format.*

30. *The method of claim 1, further comprising the steps of, prior to initiating the message exchange, determining by the matching device that the mobile terminal is not logged on or not available in the telecommunications network; and*

*causing the message to be stored in the storage device until such time as the mobile terminal is logged on or available.*

31. *The method of claim 30, further comprising notifying the mobile terminal of the availability of the message stored in the storage device.*

32. *The method according to claim 1, wherein the at least one input comprises at least one data record.*

33. *The method according to claim 1, wherein the at least one input comprises a plurality of different inputs from the mobile terminal; and*

*wherein the method further comprises receiving, by the matching device, an indication from the mobile terminal as to which of the different inputs to use as a current input.*

34. *The method of claim 1, further comprising, if the at least one input indicates that the message is to be stored in the storage device, causing the message to be stored and notifying the mobile terminal of the availability of the at least one message.*

\* \* \* \* \*